United States Patent [19]

Anderson

[11] 4,306,906

[45] Dec. 22, 1981

[54] METHOD OF MAKING METALLIC AMALGAM

[76] Inventor: Eugene R. Anderson, 123 W.S. Commerce, Wills Point, Tex. 75169

[21] Appl. No.: 110,482

[22] Filed: Jan. 8, 1980

Related U.S. Application Data

[63] Continuation-in-part of Ser. No. 85,374, Oct. 16, 1979, and a continuation-in-part of Ser. No. 68,749, Aug. 23, 1979, and Ser. No. 902,708, May 4, 1978, Pat. No. 4,182,748, and Ser. No. 902,705, May 4, 1978, Pat. No. 4,207,095.

[51] Int. Cl.$^3$ .................... C01B 13/02; C01B 1/07
[52] U.S. Cl. .................... 75/134 A; 75/134 N; 75/169; 423/657
[58] Field of Search ............ 75/134 N, 169, 134 A; 423/657

[56] References Cited

U.S. PATENT DOCUMENTS

| | | | |
|---|---|---|---|
| 969,853 | 9/1910 | Ewell | 75/169 |
| 1,803,386 | 5/1931 | Fischer et al. | 75/169 |
| 3,574,607 | 4/1971 | Merkl | 75/134 |
| 3,615,372 | 10/1971 | Braithwaite | 75/147 |
| 3,993,595 | 11/1976 | Merkl | 252/463 |
| 3,997,328 | 12/1976 | Greener | 75/0.5 R |
| 4,182,748 | 1/1980 | Anderson | 423/579 |

FOREIGN PATENT DOCUMENTS

WO79/01031  11/1979 ........................... 75/134 N

OTHER PUBLICATIONS

Comprehensive Inorganic Chemistry, Eds. Bailar et al., Pergamon, New York, 1973, pp. 283-286.

*Primary Examiner*—L. Dewayne Rutledge
*Assistant Examiner*—Upendra Roy

[57] ABSTRACT

A method of making an amalgam of alkali metal and aluminum comprises the steps of making an alkali metal amalgam under an inert atmosphere. The surface of aluminum is then coated with mercury and the coated aluminum is mixed with the alkali metal amalgam and given sufficient time to form the amalgam of alkali metal and aluminum.

8 Claims, No Drawings

METHOD OF MAKING METALLIC AMALGAM

CROSS-REFERENCE TO RELATED APPLICATIONS

This application is a continuation-in-part of application Ser. No. 902,705, entitled MATERIAL AND METHOD FOR OBTAINING HYDROGEN BY DISSOCIATION OF WATER, filed on May 4, 1978, now U.S. Pat. No. 4,207,095; of application Ser. No. 902,708, entitled MATERIAL AND METHOD FOR OBTAINING HYDROGEN AND OXYGEN BY DISSOCIATION OF WATER, filed on May 4, 1978, now U.S. Pat. No. 4,182,748; of application Ser. No. 06/068,749, entitled MATERIAL AND METHOD FOR OBTAINING HYDROGEN BY DISSOCIATION OF WATER, filed on Aug. 23, 1979; and of an application Ser. No. 085,374, entitled MATERIAL AND METHOD TO DISSOCIATE WATER AT CONTROLLED RATES, filed on Oct. 16, 1979; and is related to an application Ser. No. 085,373, entitled HYDROGEN GENERATING APPARATUS AND METHOD, filed on Oct. 16, 1979; and to application Ser. No. 06/056,994, entitled FUEL SYSTEM AND METHOD, filed on July 12, 1979.

BACKGROUND OF THE INVENTION

This invention relates to a metallic amalgam and method of combining an alkali metal and aluminum by using mercury as an amalgamation medium.

Recently I discovered a use for an amalgam of alkali metal and aluminum with an atomic weight ratio of alkali metal to mercury from about 100:1 to about 1:100 and the atomic weight ratio of alkali metal to aluminum from about 1:100 to about 100:1. Preferably, the amalgam used has an atomic weight ratio of alkali metal to mercury from about 3:1 to about 1:1.5 and the atomic weight ratio of alkali metal to aluminum from about 1:1 to about 3:1.

I further found that although it is well known in the prior art to combine alkali metals with mercury into an amalgam, providing an amalgam of alkali metal and aluminum either in a direct combination using a high temperature phase or in an indirect combination by using mercury as an amalgamation medium is not known.

The method I have found which enables production of an amalgam of alkali metal and aluminum comprises the steps of making an alkali metal amalgam under an inert atmosphere. The surface of aluminum is then coated with mercury and the coated aluminum is mixed with the alkali metal amalgam and given sufficient time to form the amalgam of alkali metal and aluminum.

It is important to remember that this method is carried out under an inert atmosphere, such as helium or argon, so as to prohibit the formation of hydroxide contaminants on the surface of the alkali metal and oxide contaminants on the surface of the alkali metal and aluminum.

Further, it is important that the surface of the aluminum be treated to remove aluminum oxide so as to enable coating the aluminum with mercury. This may be accomplished by mechanically working the aluminum, such as with a ball mill, or by immersing the aluminum in an aqueous mercuric chloride solution, preferably a saturated aqueous mercuric chloride solution, so as to deposit a coating of mercury over the aluminum, either being in particles, sheets or whatever mass form desired. The aluminum is then left in the mercuric chloride solution for a sufficient period of time to chemically replace the oxygen in the aluminum oxide with mercury. A sufficient quantity of mercury is then added to the aqueous mercuric chloride solution to thereby immerse the surface treated aluminum in the mercury and rapidly displace the mercuric chloride solution to prevent the continued contact of water in the solution with the coated aluminum. The mercuric chloride solution may then be removed by any of the well known methods for liquid removal from the surface of the mercury. The atmosphere is then purged to remove any and all moisture and oxygen. The coated aluminum and a measured amount of mercury are provided so as to make the amalgam described in application Ser. Nos. 902,705, 902,708 and 06/068,749, the information therein being incorporated herein by reference.

The mixture may then be allowed to combine in a natural fashion or this amalgamation may be facilitated by utilizing an elevated temperature, preferably around 200° C.±10° C. The amalgam is preferably maintained at this elevated temperature for about 10 minutes for the first 100 grams being processed and the time extended about 1 minute for each additional 100 grams thereafter.

The resulting amalgam is then cooled gradually to room temperature under an inert atmosphere. For this purpose, either helium or nitrogen are satisfactory and it is desirable that cooling be effected in a desiccator to ensure that no water contacts the amalgam.

EXAMPLE I

An amalgam of sodium and aluminum is obtained by withdrawing 35.1 grams of liquid sodium while maintaining a dry argon atmosphere thereover to provide a hydroxide and oxide free sodium. This hydroxide and oxide free sodium is then added to 36.8 grams of mercury at a rate to prevent boiling or vaporization of the mercury to thereby make 71.9 grams of sodium amalgam.

13.7 grams of 10 mesh aluminum is then immersed in a saturated aqueous mercuric chloride solution for approximately 30 seconds to chemically replace the oxide in the aluminum oxide with mercury.

Sufficient mercury is then rapidly added to the aqueous mercuric chloride solution so as to displace the aqueous mercuric chloride solution and totally immerse the coated aluminum.

The aqueous mercuric chloride is removed from the container supporting the coated aluminum and the atmosphere is purged to remove any and all moisture and oxygen.

The coated aluminum and 14.4 grams of mercury are then mixed with the 71.9 grams of sodium amalgam and heated at 200° C. for 10 minutes to make approximately 100 grams of sodium-aluminum amalgam.

EXAMPLE II

An amalgam of potassium and aluminum is obtained by withdrawing 31.1 grams of liquid potassium while maintaining a dry argon atmosphere thereover to provide a hydroxide and oxide free potassium. This hydroxide and oxide free potassium is then added to 30.5 grams of mercury at a rate to prevent boiling or vaporization of the mercury to thereby make 61.6 grams of potassium amalgam.

19.4 grams of 10 mesh aluminum is then immersed in a saturated aqueous mercuric chloride solution for approximately 30 seconds to chemically replace the oxide in the aluminum oxide with mercury.

Sufficient mercury is then rapidly added to the aqueous mercuric chloride solution so as to displace the solution and totally immerse the coated aluminum.

The aqueous mercuric chloride is removed from the container supporting the coated aluminum and the atmosphere is purged to remove any and all moisture and oxygen.

The coated aluminum and 19.0 grams of mercury are then mixed with the 61.6 grams of potassium amalgam and heated at 200° C. for 10 minutes to make approximately 100 grams of potassium-mercury amalgam.

EXAMPLE III

An amalgam of cesium and aluminum is obtained by withdrawing 32.1 grams of liquid cesium while maintaining a dry argon atmosphere thereover to provide a hydroxide and oxide free cesium. This hydroxide and oxide free cesium is then added to 13.9 grams of mercury at a rate to prevent boiling or vaporization of the mercury to thereby make 46.0 grams of cesium amalgam.

37.7 grams of 10 mesh aluminum is then immersed in a saturated aqueous mercuric chloride solution for approximately 30 seconds to chemically replace the oxide in the aluminum oxide with mercury.

Sufficient mercury is then rapidly added to the aqueous mercuric chloride solution so as to displace the solution and totally immerse the coated aluminum.

The aqueous mercuric chloride is removed from the container supporting the coated aluminum and the atmosphere is purged to remove any and all moisture and oxygen.

The coated aluminum and 16.3 grams of mercury are then mixed with the 46.0 grams of cesium amalgam and heated at 200° C. for 10 minutes to make approximately 100 grams of cesium-mercury amalgam.

The invention having been described, what is claimed is:

1. A method of making an amalgam for dissociating water to obtain hydrogen, comprising the steps of: making an alkali metal amalgam consisting essentially of an alkali metal and mercury under an inert atmosphere; coating the surface of aluminum with mercury; mixing the coated aluminum with the alkali metal amalgam; and maintaining the temperature of the mixture for a sufficient period of time to form the amalgam.

2. The method of claim 1, including removing aluminum oxide from the surface of the aluminum; and immersing the surface treated aluminum in mercury.

3. The method of claim 2, including immersing the aluminum in an aqueous mercuric chloride solution to remove the aluminum oxide.

4. The method of claim 1, including heating the mixture of coated aluminum and alkali metal amalgam to facilitate amalgamation.

5. The method of claim 1, including mechanically working the aluminum to remove aluminum oxide from the surface.

6. The method of claim 1, including surface treating the alkali metal to remove oxides and hydroxide contaminants; and adding the treated alkali metal to mercury under an inert atmosphere to make the alkali metal amalgam.

7. A method of making an amalgam for dissociating water to obtain hydrogen, comprising the steps of: making an alkali metal amalgam consisting essentially of alkali metal and mercury under an inert atmosphere; removing aluminum oxide from the surface of aluminum; coating the oxide free surface of aluminum with mercury; mixing the coated aluminum with the alkali metal amalgam; and heating the mixture to a temperature for a sufficient period of time to facilitate amalgamation.

8. A method of making an amalgam for dissociating water to obtain hydrogen, comprising the steps of: making an alkali metal amalgam consisting essentially of alkali metal and mercury under inert atmosphere; immersing the aluminum in an aqueous mercuric chloride solution to remove aluminum oxide from the surface of aluminum and to coat the aluminum with the aluminum with mercury; mixing the coated aluminum with the alkali metal amalgam; and heating the mixture to a temperature for a sufficient period of time to facilitate amalgamation.

* * * * *